J. E. BARBOUR.
HACKLING AND FINISHING MACHINE FOR LONG STAPLE FIBER.
APPLICATION FILED JULY 1, 1908.

1,059,105.

Patented Apr. 15, 1913.

J. E. BARBOUR.
HACKLING AND FINISHING MACHINE FOR LONG STAPLE FIBER.
APPLICATION FILED JULY 1, 1908.

1,059,105.

Patented Apr. 15, 1913.

J. E. BARBOUR.
HACKLING AND FINISHING MACHINE FOR LONG STAPLE FIBER.
APPLICATION FILED JULY 1, 1908.

1,059,105.

Patented Apr. 15, 1913.

J. E. BARBOUR.
HACKLING AND FINISHING MACHINE FOR LONG STAPLE FIBER.
APPLICATION FILED JULY 1, 1908.

1,059,105.

Patented Apr. 15, 1913.
11 SHEETS—SHEET 10.

J. E. BARBOUR.
HACKLING AND FINISHING MACHINE FOR LONG STAPLE FIBER.
APPLICATION FILED JULY 1, 1908.

1,059,105.

Patented Apr. 15, 1913.

UNITED STATES PATENT OFFICE.

JOHN E. BARBOUR, OF PATERSON, NEW JERSEY.

HACKLING AND FINISHING MACHINE FOR LONG-STAPLE FIBER.

1,059,105.   Specification of Letters Patent.   Patented Apr. 15, 1913.

Application filed July 1, 1908. Serial No. 441,500.

*To all whom it may concern:*

Be it known that I, JOHN E. BARBOUR, a citizen of the United States, and resident of Paterson, in the county of Passaic and State of New Jersey, have invented a new and useful Improvement in Hackling and Finishing Machines for Long-Staple Fiber, of which the following is a specification.

This invention relates to improvements in hackling and finishing machines for long-staple fiber, such, for instance, as flax, and has for its object to provide certain improvements in the construction, form and arrangement of the several parts whereby the fiber may be successively hackled and finished in a rapid and thorough manner with a minimum amount of handling on the part of the operator.

With the above object in view, this invention provides novel means whereby the fiber may be fed continuously through the hackling mechanism in a right line, thus doing away with the necessity of raising and lowering the fiber holders.

This invention also provides for novel means for reversing the fiber holders, which means are so arranged and operated that the fiber holders are successively turned up into a vertical position as they enter the hackling mechanisms and successively knocked down into a horizontal position as they leave the hackling mechanisms.

This invention also provides for means for adjusting the co-acting groups of hackling pins toward and away from each other to adjust the hackling mechanism for coarser and finer fiber.

The machine embodying this invention, as herein shown and described, comprises two sets of hackling and finishing mechanisms; a stationary track passing therethrough; fiber holders; longitudinally arranged endless carriers for feeding the holders in a vertical position continuously along the track through the sets of hackling and finishing mechanisms; transversely arranged endless carriers for feeding the holders intermittently along the track between the sets of hackling and finishing mechanisms; devices for successively turning the holders up into a vertical position as they enter the sets of hackling and finishing mechanisms; devices for knocking the holders down into a horizontal position as they leave the sets of hackling and finishing mechanisms; means for releasing and clamping the fiber holders at one end of the machine to permit the shifting of the fiber in the holders; and means for releasing and clamping the holders at the other end of the machine to permit the removal of the hackled and finished fiber and the insertion of the unhackled fiber.

In the accompanying drawings, Fig. 2 is a view in elevation of the opposite end of the machine; Fig. 2$^a$ is a detail view showing the rack and pinion connection for rotating the spindle which clamps and releases the fiber holder at the change end of the machine; Fig. 12 is a detail view in the plane of the line D—D of Fig. 11, looking in the direction of the arrows.

Figures 24, 25, 26:
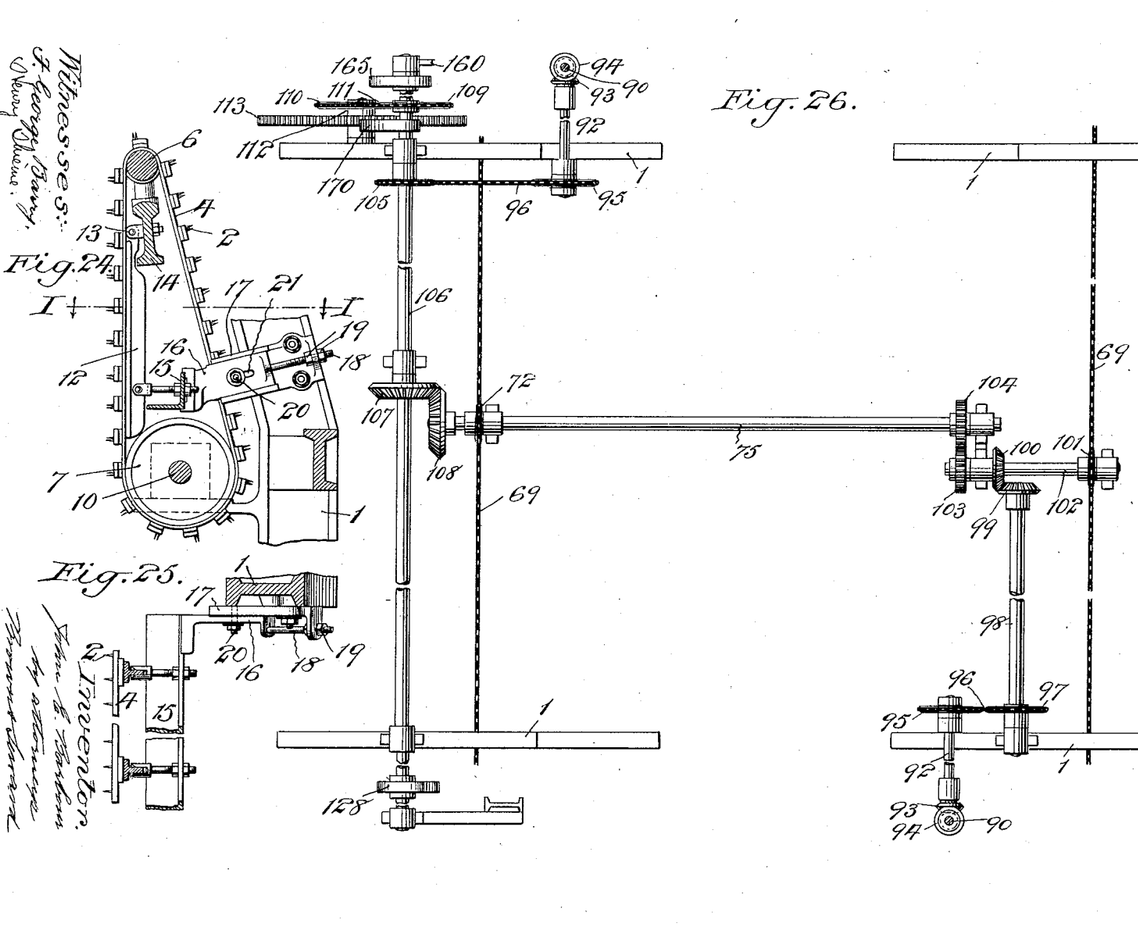
Fig. 24 is an enlarged detail section of one of the devices for adjusting the groups of hackling pins toward and away from another group.
Fig. 25 is a horizontal section taken in the plane of the line I—I of Fig. 24, looking in the direction of the arrows.
Fig. 26 is a diagrammatic plan view of the connections for driving the fiber holder carriers.

The machine as herein shown and described comprises two sets of hackling and finishing mechanisms and means for feeding the fiber therethrough, as follows. The main framing of the machine is denoted by 1. The two hackling mechanisms each comprises two co-acting groups of hackling pins 2, 3, arranged on endless belts 4, 5, which pass around top and bottom rollers 6, 7, 8, 9, respectively. The shafts of the bottom rollers 7, 9, are denoted by 10, 11. Means are provided for adjusting the lower portions of the co-acting groups of hackling pins toward and away from each other for acting upon coarser or finer fiber, as follows. A series of plates 12 are hinged at their upper ends, as shown at 13, to the longitudinally disposed frame bar 14 of the machine. The free ends of these plates 12 are connected to a longitudinally disposed adjusting bar 15, which adjusting bar is provided with a slide 16 having a longitudinal movement in a guide 17 fixed to the framing 1. An adjusting screw 18 engages the slide 16 and the guide 17, which screw is provided with set nuts 19 for holding the adjusting screw 18 in its different adjustments. The slide 16 has a pin and slot connection 20, 21, for holding the slide in position on the guide.

Figures 5, 6, 7, 8:
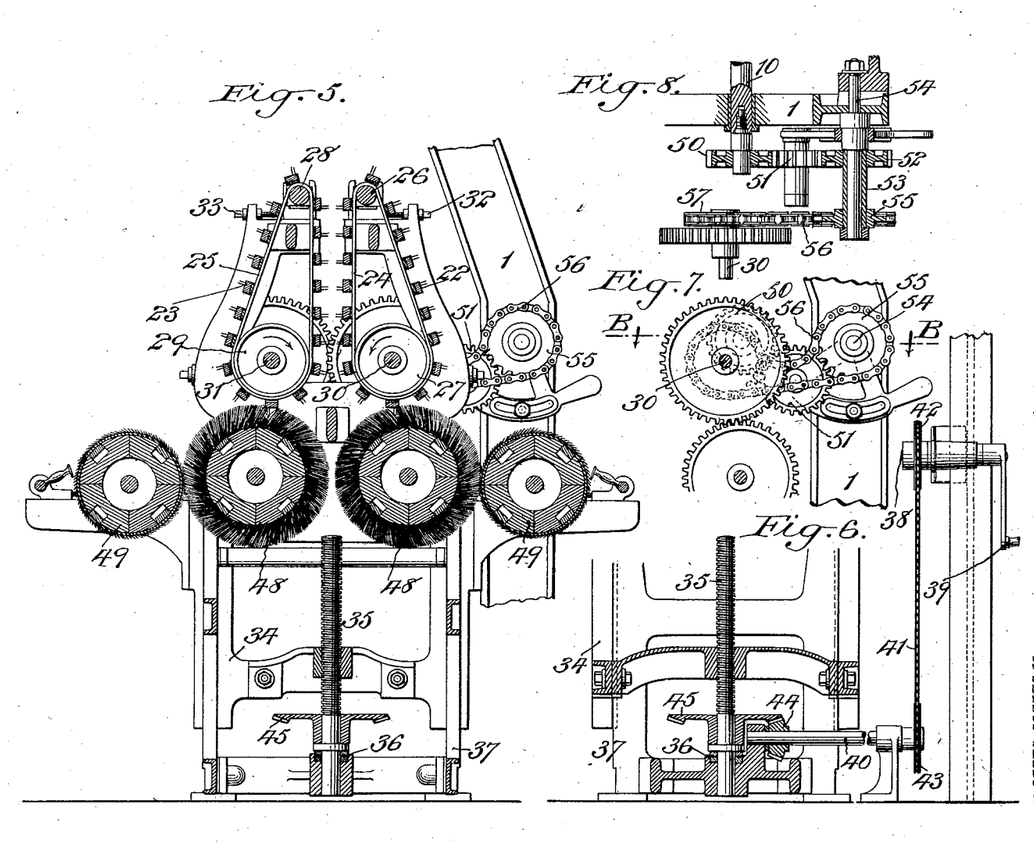
Fig. 5 is an enlarged vertical section taken transversely through one of the fiber finishing mechanisms.
Fig. 6 is a detail section taken at right angles to Fig. 5, showing the means for raising and lowering the fiber finishing mechanism.
Fig. 7 is a detail view showing the driving connection between the finishing mechanism and the hackling mechanism.
Fig. 8 is a section taken in the plane of the line B—B of Fig. 7, looking in the direction of the arrows.

The fiber finishing mechanisms which are arranged to receive the fiber as it leaves the hackling mechanisms, each comprises two groups of hackling pins 22, 23, carried upon endless belts 24, 25, which pass around top and bottom rollers 26, 27 and 28, 29, respectively. The shafts of the bottom rollers 27, 29, are denoted by 30, 31 respectively. Devices 32, 33, are provided for adjusting the upper portions of the co-acting groups of hackling pins toward and away from each other. The framework on which the finishing mechanism is mounted is denoted by 34 and it is adjusted bodily in a vertical direction to adapt the machine for finishing the ends of longer or shorter fiber, as follows. A vertical screw 35 is mounted in suitable bearings 36 in an auxiliary framing 37. This screw engages the vertically movable frame 34 so that as the screw is rotated, the frame 34 will be raised and lowered. The means which I have shown for rotating this screw by hand comprises a crank shaft 38 having a suitable handle 39, which crank shaft is connected to a short cross shaft 40 through a chain and sprocket connection 41, 42, 43, the cross shaft 40 having a bevel gear connection 44, 45, with the said screw 35.

Each hackling mechanism is provided with the usual brush and doffer rolls 46, 47, and each finishing mechanism is provided with the usual brush and doffer rolls 48, 49. The driving connection between each set of hackling and finishing mechanisms is as follows. The shaft 10, for instance, of one of the hackling pin rolls has fixed thereto a spur gear 50 which meshes with an intermediate gear 51 which in turn meshes with a spur gear 52 fixed to the sleeve 53 loosely mounted on a stud shaft 54 carried by the main framing 1. A sprocket wheel 55 is fixed to the sleeve 53 and is connected by a chain 56 with a sprocket 57 fixed to the shaft 30 of one of the hackling pin rolls of the finishing mechanism. The sprocket chain 56 is made of sufficient length to permit a considerable vertical movement of the shaft 30 with respect to the shaft 54, whereby the finishing mechanism may be adjusted vertically without impairing the driving connection between it and the hackling mechanism.

Figure 15:
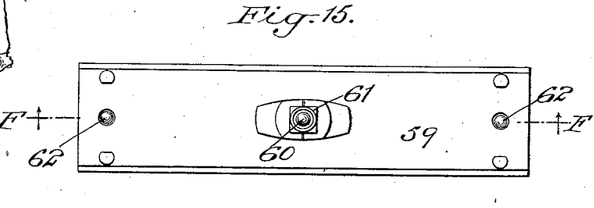
Fig. 15 is a plan view of the holder.
Figure 16:
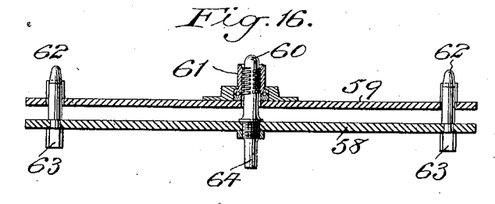
Fig. 16 is a section taken in the plane of the line F—F of Fig. 15, looking in the direction of the arrows.

The fiber holder comprises a plate 58 and a cover 59 arranged to clamp and release the bunches of fiber. The plate 58 is provided with a centrally arranged screw stud 60 extended through the cover 59 where it is engaged by a rotary nut 61 carried by the cover. Guide pins 62 also project from the plate 58 at the ends thereof through the cover 59 for guiding the covers in their movement toward and away from the plate. This plate 58 is further provided with exterior lugs 63 at the corners thereof and a centrally arranged exterior lug 64 which forms an extension of the screw stud 60.

A stationary track passes through the sets of hackling and finishing mechanisms, which track is so arranged that it will support the fiber holders in a vertical position while passing through the sets of hackling and finishing mechanisms and in a horizontal position while passing between them. The longitudinal sections of the track which pass through the sets of hackling and finishing mechanisms, are denoted by 65 and the transverse sections of the track at the opposite ends of the machine are denoted by 66. The outer walls of the transverse sections 66 of the track at the turns in the track are curved as shown at 67, for engaging the advance ends of the holders and guide them around the corners between the transverse sections of the track and the longitudinal extensions 68 thereof which extend into position beneath the ends of the longitudinal sections 65 of the track.

Figures 9, 10:
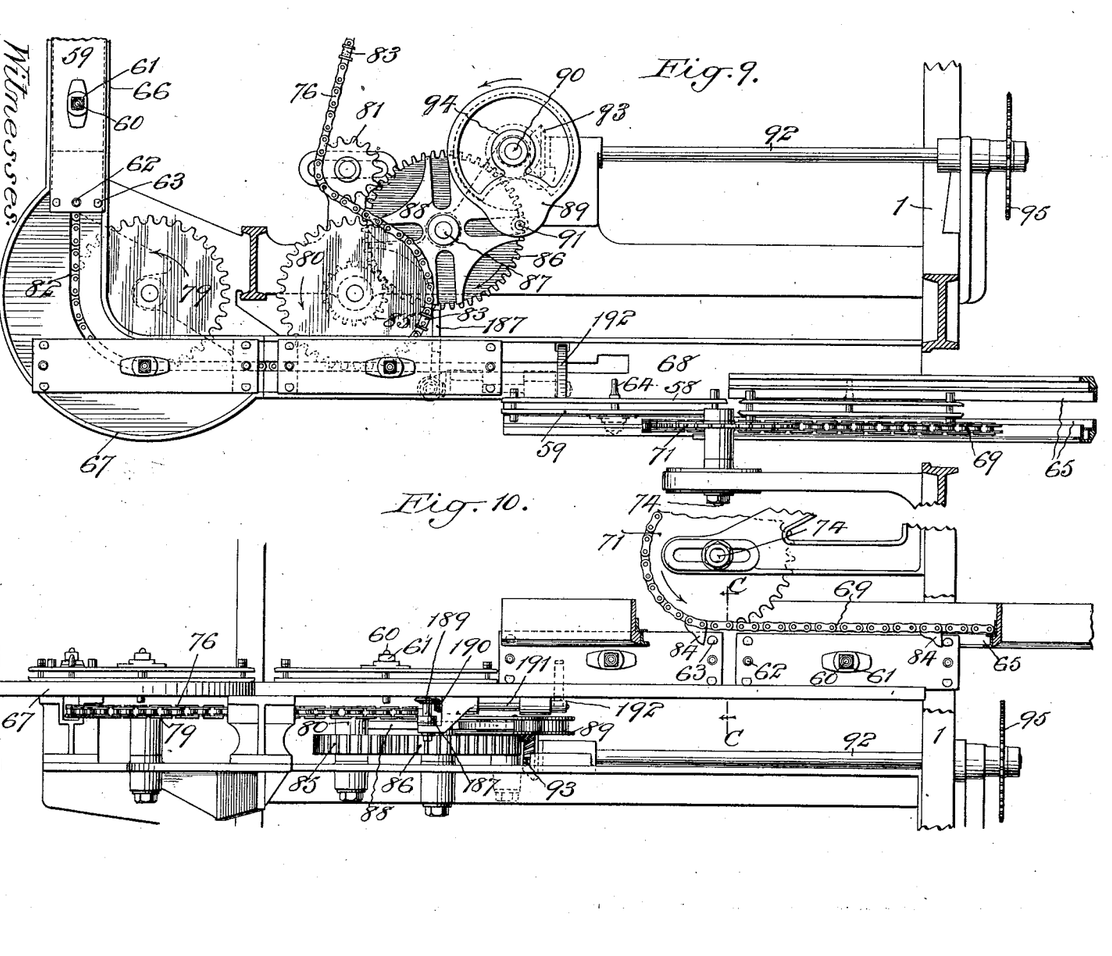
Fig. 9 is an enlarged detail view showing the means for feeding the fiber holders intermittently into the hackling mechanism, the means for feeding the holders continuously through the hackling mechanism and the means for turning the fiber holders from their horizontal position to their vertical position before entering the hackling mechanism.
Fig. 10 is a detail side view of the parts shown in Fig. 9, with a portion of the stationary track which passes through the hackling mechanism broken away to show more clearly the means for engaging and feeding the fiber holders continuously along the track through the hackling mechanisms.

The means for feeding the fiber holders along the longitudinal section 65 of the track, through each set of hackling and finishing mechanisms, with a continuous movement in a right line, is as follows. The vertically arranged endless carrier at one side of the machine, which, in the present instance comprises a chain 69, passes around sprocket wheels 70, 71, at the ends of the machine and an intermediate sprocket wheel 72 at the top of the machine. The sprocket wheels 70, 71, are mounted on stud axles 73, 74, respectively, and the sprocket wheel 72 is fixed on a cross shaft 75 mounted in the framing 1 of the machine.

The endless carrier 69 is provided at intervals with abutments 84 which engage certain of the lugs 63 of the holders. Each of these abutments 84 is carried by a link of the chain which comprises the endless carrier. The endless carrier 69 at the other side of the machine passes around an intermediate sprocket 101 fixed to a cross shaft 102, which shaft is provided with a spur gear 103 meshing with a spur gear 104 on the shaft 75.

Figures 11, 13:
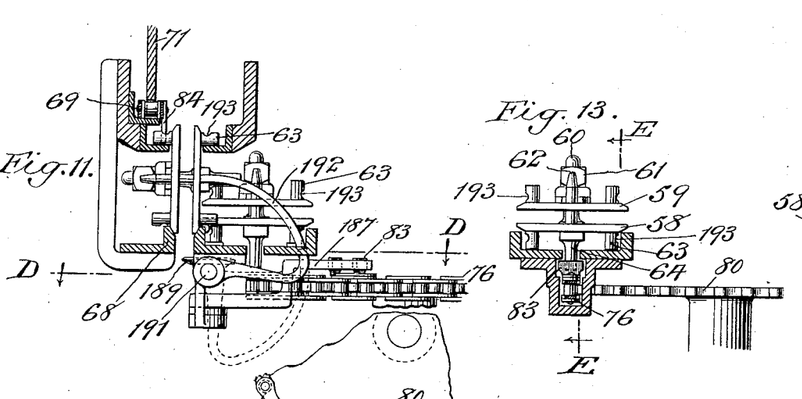
Fig. 11 is an enlarged detail section taken in the plane of the line C—C of Fig. 10, looking in the direction of the arrows, showing more clearly the means for turning the fiber holders up into their vertical position before entering the hackling mechanism.
Fig. 13 is a detail transverse section showing the means for feeding the holders when in their horizontal position.
Figure 14:
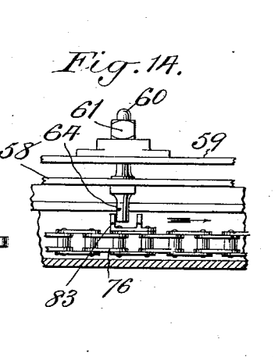
Fig. 14 is a section taken in the plane of the line E—E of Fig. 13, looking in the direction of the arrows, the holder being shown in full lines.

The means for feeding the fiber holders intermittently along the transverse sections of the track and the adjacent ends of the longitudinal sections of the truck at each end of the machine, is as follows. A horizontally arranged endless carrier, such, for instance, as a sprocket chain 76, passes around sprocket wheels 77, 78, 79, 80, and a slack adjusting idler sprocket 81. These sprocket wheels are so arranged as to bring the endless chain immediately beneath the stationary track and the said track is provided with a slot 82 therein, through which the studs 64 of the holders extend into position to be engaged by abutments 83 arranged at intervals along the sprocket chain 76, each of which abutments is carried by one of the links of the chain which comprises the endless carrier.

The intermittent movement of the endless sprocket chain 76 is provided for as follows. The sprocket wheel 80 is provided with a pinion 85 which meshes with a spur gear 86 on a stud shaft 87, to which stud shaft there is fixed a star wheel 88. A disk 89 is fixed to a continuously rotating shaft 90, which disk is provided with a pin 91 arranged to coact with the star wheel 88 for moving the wheel and thereby the spur gear 86 intermittently at predetermined intervals. This stud shaft 90 is rotated from a shaft 92 through a bevel gear connection 93, 94. This shaft 92 is provided with a sprocket wheel 95. At the feed end of the machine the sprocket wheel 95 is driven by a chain 96 from a sprocket wheel 97 fixed on a stud shaft 98 which is driven from the shaft 102 through a bevel gear connection 99, 100. At the opposite end of the machine the sprocket wheel 95 is driven by its chain 96 from a sprocket wheel 105 fixed to a shaft 106, which shaft also drives the shaft 75 through a bevel gear connection 107, 108. This shaft 106 is also provided with a sprocket wheel 109 which is driven from a sprocket wheel 110 through a chain 111. This sprocket wheel 110 is mounted on a stud axle 112 and has fixed thereto a spur gear 113 which is driven from the main drive shaft 114 through a train of gears 115, 116, 117, 118, 119, 120. This drive shaft 114 may be provided with fixed and loose pulleys 121, 122. Trains of gearing, a specific description of which will not be made herein as they form no part of the present invention, connect the main drive shaft 114 with the several hackling and finishing mechanisms.

Means for lifting the fiber holder covers successively at the feed end of the machine to permit the removal of the hackled and the insertion of the unhackled fiber will now be described; a description of the means for successively releasing the covers before they reach the cover lifting mechanism and for successively clamping the covers after they leave the cover lifting mechanism being reserved for a later time.

Figures 17, 18, 19:
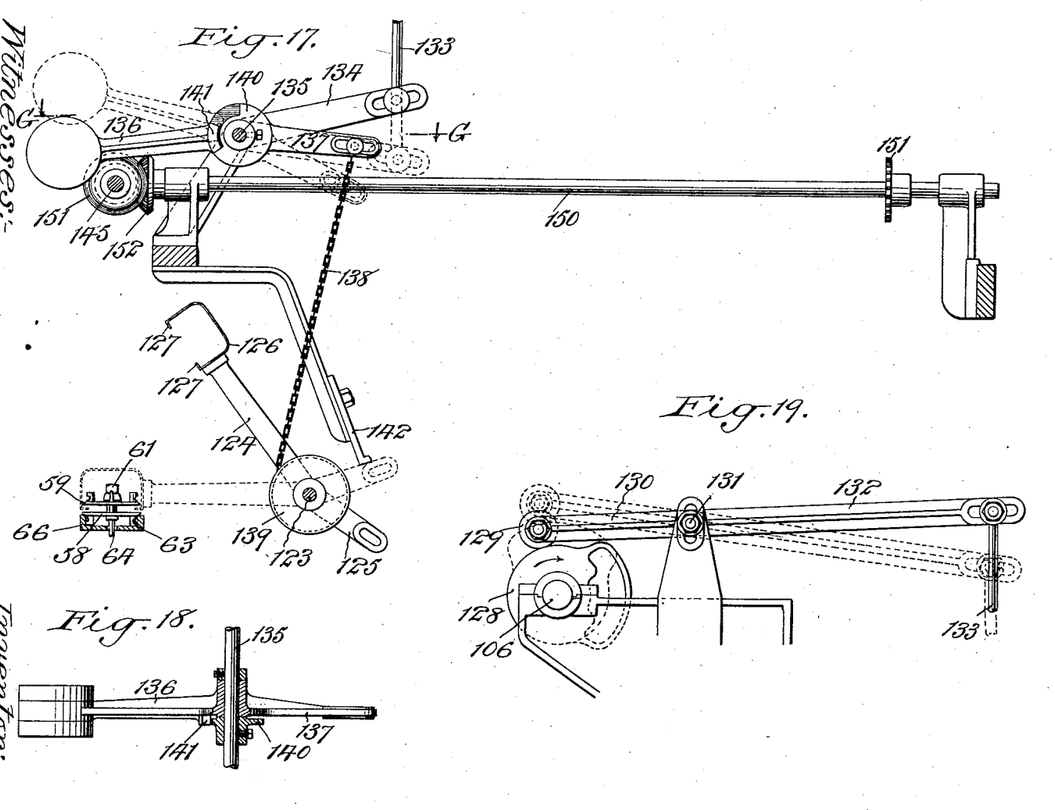
Fig. 17 is a detail view showing a portion of the means for operating the holder cover lifting device.
Fig. 18 is a section taken in the plane of the line G—G of Fig. 17, looking in the direction of the arrows.
Fig. 19 is a view of the balance of the means for operating the holder cover lifting device.

The holder cover lifter is pivoted at 123, which lifter comprises a forwardly extended arm 124 and a rearwardly extended arm 125. The forwardly extended arm 124 is provided with a hood 126 having inwardly turned flanges 127 arranged to engage the side edges of the cover 59 as the holder is moved into position to be operated upon by the lifter. The cover 59 is lifted away from its plate 58 by the upward movement of the lifter arm 124. The lifter is raised and lowered as follows. A cam 128 is fixed on the shaft 106, which cam engages a roller 129 on one arm 130 of a two-armed lever pivoted at 131, the other arm 132 of which lever engages the upper end of a connecting rod 133, the lower end of which rod is connected to an arm 134 fixed to a rock shaft 135. A counterbalance lever is loosely mounted on the shaft 135 the weighted arm of which lever is denoted by 136 and the other arm by 137. The arm 137 is provided with a chain or other flexible connection 138 which passes partially around and is secured to a pulley 139 fixed to rock with the lifter 124, 125. This counterbalance lever 136 is adjustably connected to the rock shaft 135 by providing the shaft with a rotatably adjustable segmental disk 140 which engages a projection 141 on the counterbalance lever. The limit of the downward movement of the lifter arm 124 may be accurately determined by an adjustable stop 142. The several connecting parts of the lifter operating means are adjustably connected so as to obtain an accurate predetermined movement of the several parts with respect to one another.

The means for simultaneously releasing one of the fiber holder covers and clamping another of the fiber holder covers at the feed end of the machine upon opposite sides of the lifter, is as follows. Two oppositely rotating spindles 143, 144, have sockets at their lower ends arranged to engage the rotating nuts 61 of the holder covers. These spindles are rotated from a cross shaft 145 through bevel gear connections 146, 147, 148, 149, respectively. This shaft 145 is driven from a shaft 150 through a bevel gear connection 151, 152 and the shaft 150 is driven from a gear 153 on the shaft 11, through a gear 154, sprocket wheel 155, sprocket chain 156 and sprocket wheel 157. The spindles 143, 144 are raised and lowered by means of the arms 158, 159 fixed to the rock shaft 135.

Figure 1:
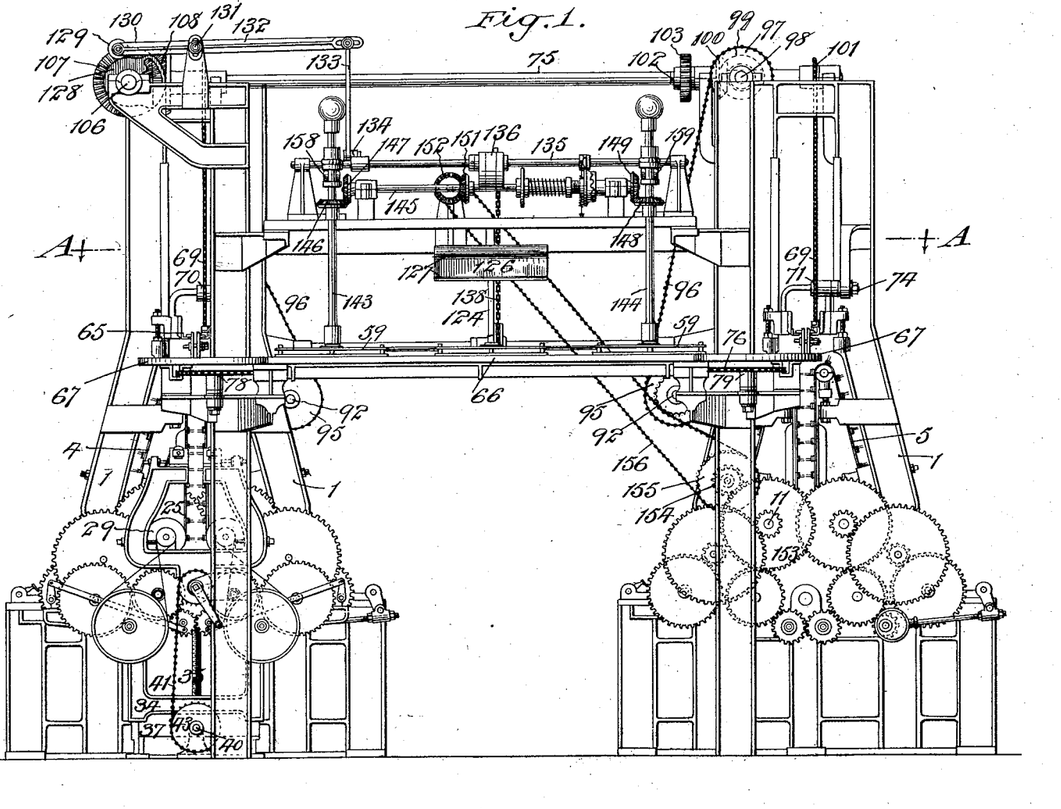
Figure 1 is a view in end elevation of one end of a hackling and finishing machine embodying the present invention.
Figures 2, 2A:
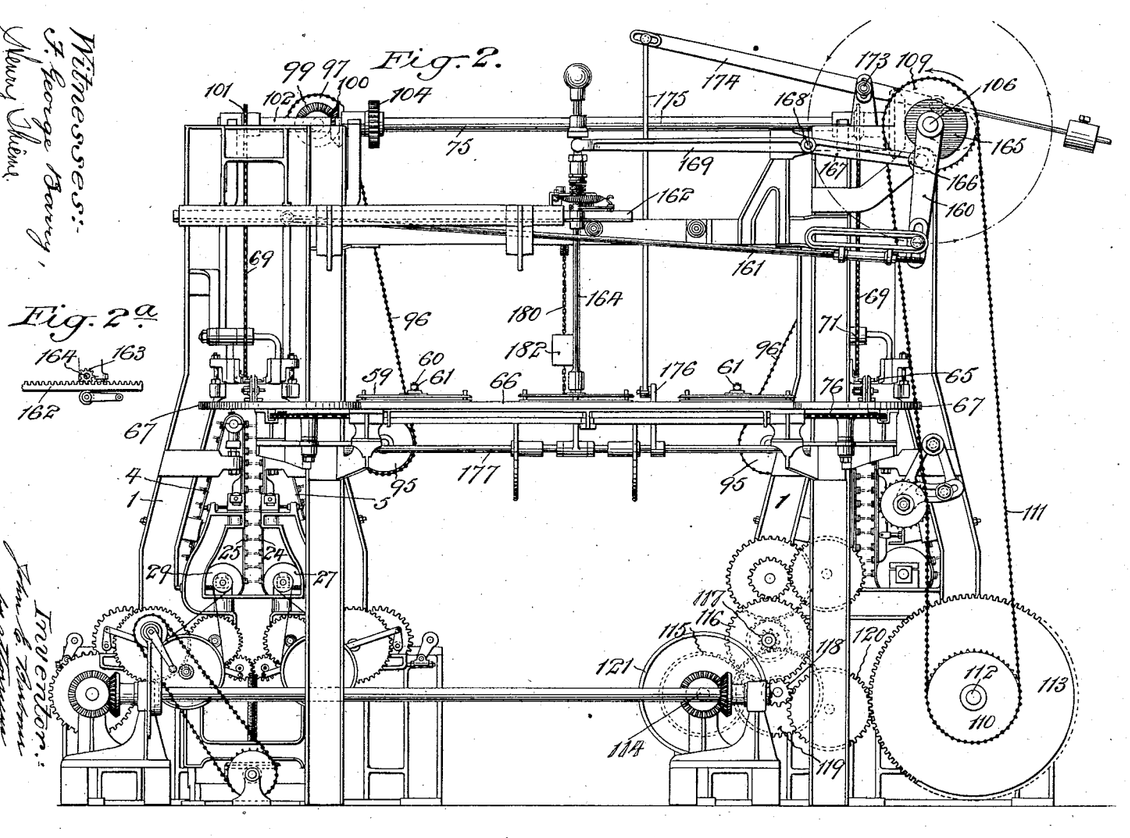
Figure 3:
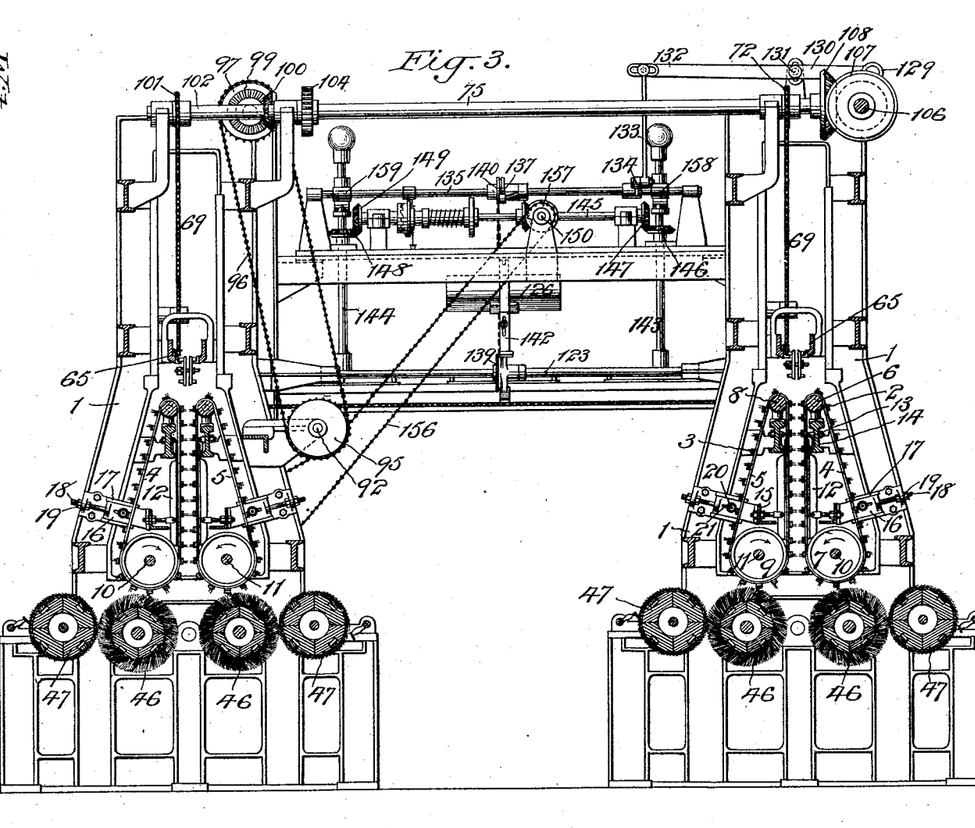
Fig. 3 is a vertical central section taken transversely through the machine.

The means for successively releasing and clamping the fiber holders at the change end of the machine for permitting the fiber to be shifted along within the holders to bring its unhackled portion to be hackled, is as follows. An arm 160 is fixed to rotate with the shaft 106, to which arm one end of a connecting rod 161 is secured, the other end of which arm is secured to a rack 162 for reciprocating the rack as the shaft is rotated. This rack meshes with a pinion 163 on a spindle 164 the lower end of which is provided with a socket for engaging the nuts 61 of the covers 59 of the holders. When the spindle is rotated in one direction, the holder will be clamped and when in the other direction, the holder will be released. The spindle is raised and lowered by providing a cam 165 on the rotary shaft 106, which cam engages a roller 166 on one arm 167 of a rocking lever pivoted at 168, the other arm 169 of which lever engages the spindle 164.

Figure 20:
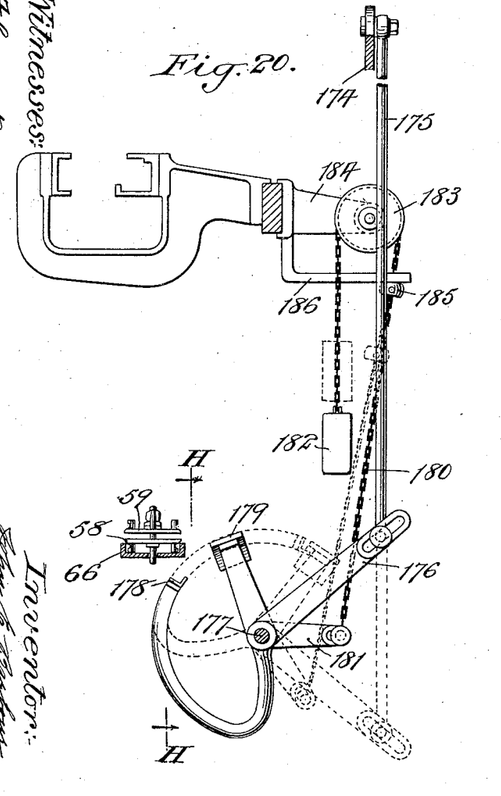
Fig. 20 is a detail view showing a portion of the means for shifting the fiber within its holder.
Figure 21:
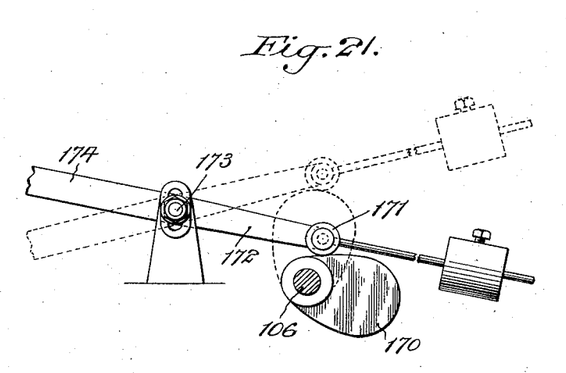
Fig. 21 is a detail view showing the balance of the means for shifting the fiber within its holder.
Figure 22:
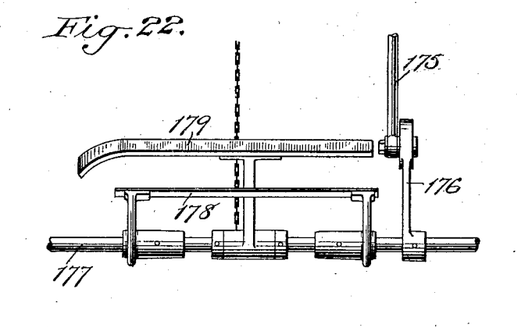
Fig. 22 is a view taken in the plane of the line H—H of Fig. 20, looking in the direction of the arrows.

The means for shifting the fiber within the holder when the holder is released, is as follows. The shaft 106 is provided with a cam 170 which engages a roller 171 on the weighted end 172 of a counterbalance lever pivoted at 173, the other arm 174 of which lever is attached to the upper end of a connecting rod 175, the lower end of which connecting rod 175 is attached to an arm 176 fixed to a rock shaft 177. One jaw 178 of a fiber shifting clamp is fixed to rock with the shaft 177 and the other jaw 179 is loosely mounted on said shaft, said last named jaw being held at the limit of its forward movement by means of a weighted chain or other flexible connection 180, having one end attached to an arm 181 of the jaw 179 and its other end provided with a weight 182. This chain passes over a loose pulley 183 mounted on a bracket 184. The chain is further provided with an abutment 185 which is normally held against a stop 186 by the weight 182. The normal position of the jaws of the clamp is such that as the holders pass along the transverse section 67 of the stationary track, the unhackled portion of the fiber will be introduced between the jaws 178, 179. After the holder is released, the unhackled portion of the fiber is clamped between the jaws by the movement of the jaw 178 toward the jaw 179 and the shifting of the fiber is accomplished by the combined limited movement of the two jaws away from the holder.

The means for successively turning the fiber holders from their horizontal position up into their vertical position as they enter the hackling mechanisms are each constructed, arranged and operated as follows. A horizontally rocking arm 187 is located normally in the path of the abutment 83 on the endless chain 76 as they pass around the sprocket wheel 80. This arm 187 is fixed to a short vertical shaft 188 which has a bevel gear connection 189, 190 with a horizontally arranged rock shaft 191, which rock shaft has fixed thereto a vertically rocking arm 192. The free end of this arm is adapted to engage each fiber holder and turn the holder up into a vertical position. This movement brings the holder up from the longitudinal extension at one end of the transverse section of the track into position to be fed along the longitudinal section of the track. As the holders are first turned up into their vertical position, their lower edges will rest upon the longitudinal extension 68 of the transverse section of the track until the holders have been engaged by the abutments 84 and fed along into position to suspend the holders by their lugs 63. These lugs 63 are provided in their outer surfaces with recesses 193 so that the set of lugs which are being used as the pivot on which the holders are swung from their horizontal to their vertical position will insure the proper swinging of the holders by the entering of the top edge of one side wall of the track into said recesses.

At the feed end of the machine the inner sides of the holders are swung upwardly so that the fiber depending from the outer sides of the holders will be hackled and finished and at the change end of the machine the outer sides of the holders will be swung upwardly so as to permit the fiber depending from the inner sides of the holders to be hackled and finished.

Figures 4, 23:
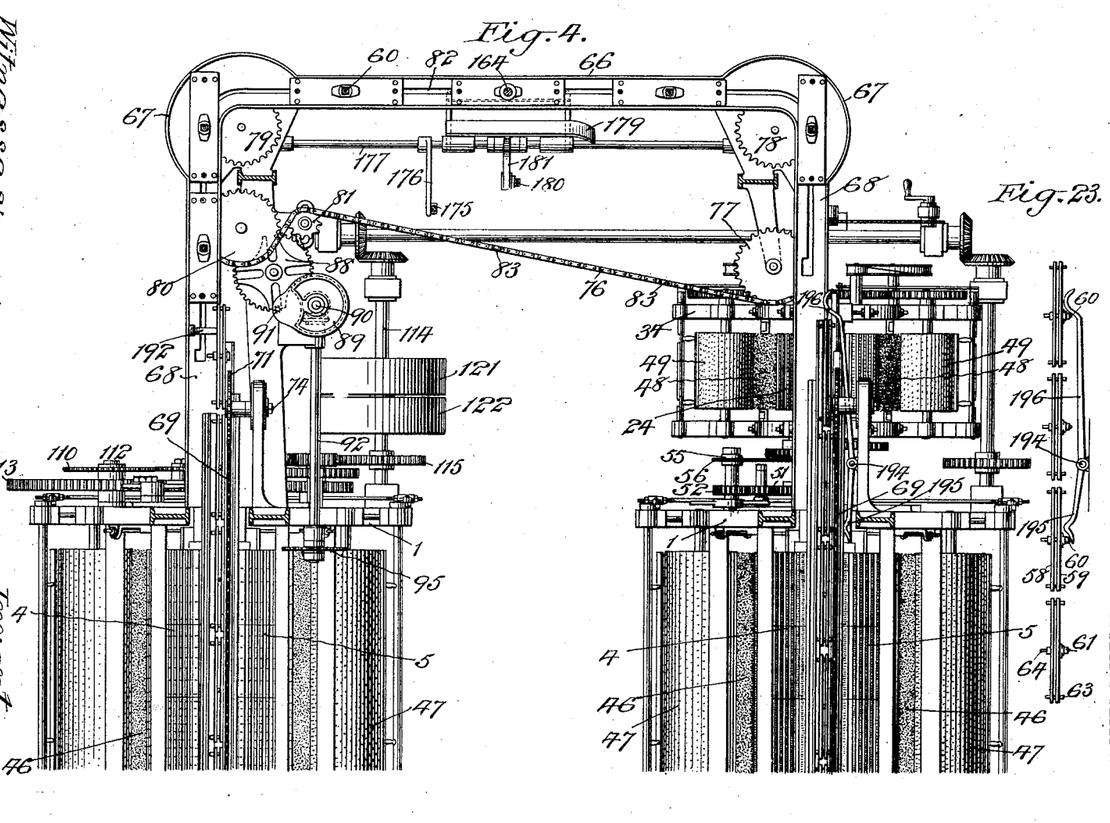
Figs. 4 and 4$^a$ represent horizontal sections taken in the plane of the line A—A of Fig. 1, looking in the direction of the arrows.
Fig. 23 is a detail view of the device for knocking the holders down from their vertical to their horizontal position after leaving each set of hackling and finishing mechanisms.
Figure 4A:
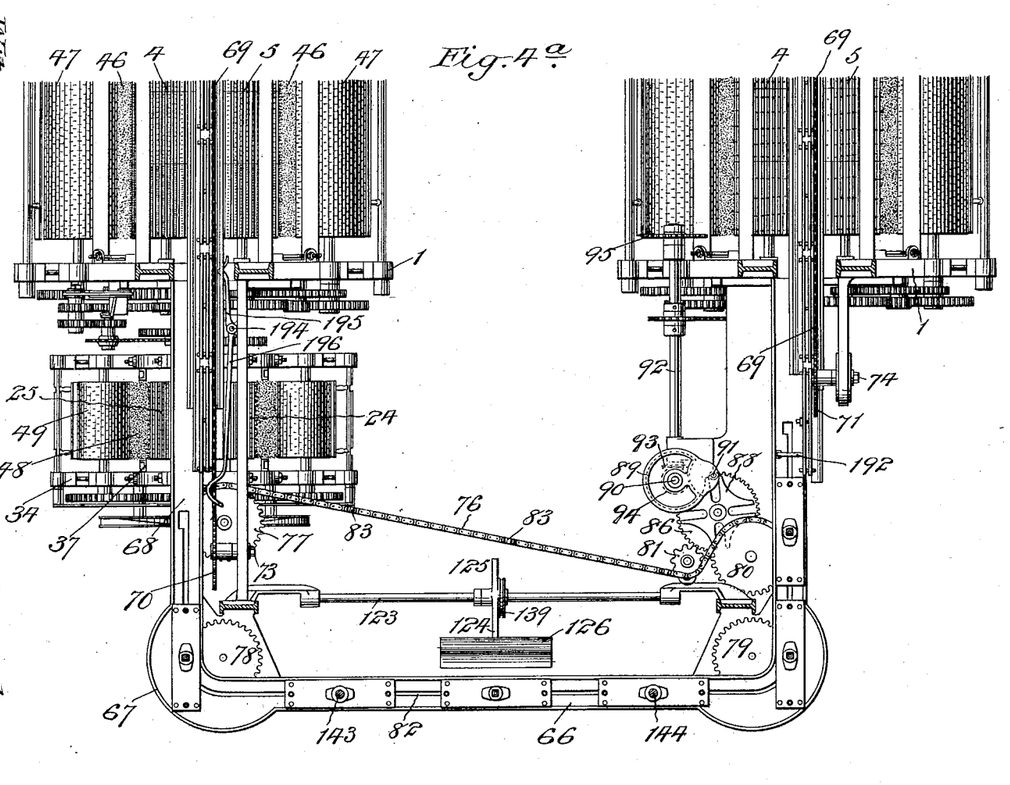

The means for successively knocking the holders down from their vertical position into their horizontal position as they leave the finishing mechanisms at both ends of the machine are each constructed, arranged and operated as follows: A horizontally swinging rocking lever is pivoted at 194, one arm 195 of which lever is arranged in position to be engaged by the screw studs 60 of the holders and swung latterly thereby as the holders pass the said arm; the other arm 196 of said lever being arranged to be swung laterally against the covers 59 of the holders, thus knocking them down into a horizontal position upon the longitudinal extensions 68 of the transverse sections 66 of the track. As the holders are knocked down into this horizontal position, they are successively engaged by the abutments 83 on the endless carriers 76 and fed along intermittently thereby as hereinbefore stated.

Proceeding to describe the operation of this machine: Each fiber holder with its bunch of unhackled fiber is fed intermittently in a horizontal position along the transverse section 66 at the feed end of the track by the engagement of one of the abutments 83 on the transversely arranged endless carrier 76, with the lug 64 of the holder. The holder is guided around the corner on to the longitudinal extension 68 of the transverse section of the track by the curved outer wall 67. As the holder nears the longitudinal section 65 of the track, it will be turned up in a vertical position where it can be engaged by one of the abutments 84 on the longitudinally arranged endless carrier 69 and fed continuously along the longitudinal section 65 of the track in a right line through one set of hackling and finishing mechanisms. As the holder leaves the longitudinal section 65 of the track, it is knocked down into a horizontal position upon the longitudinal extension 68 of the transverse section 66 at the change end of the machine into position to be fed intermittently along the said transverse section by the engagement of one of the abutments 83 of the endless carrier 76 with the lug 64 of the holder. The holder is guided around the corner from the extension 68 by the curved outer wall 67. As the holder nears the fiber shifting device, it will be released from its clamping engagement with the fiber by the unscrewing of the nut 61 of the holder. The next step in the movement of the holder will bring it into position to permit the fiber to be shifted within the holder by the fiber shifting device so as to present the unhackled portion of the fiber which was clamped within the holder into position to be hackled with the balance of the unhackled portion of the fiber. The next step in the movement of the holder will bring it into position to again clamp the fiber by the screwing down of the nut 61 on the holder. The holder from this point will be guided around the corner on to the other extension 68 of the transverse section of the track by the curved outer wall 67. As the holder nears the longitudinal section 65 of the track which passes through the second set of hackling and finishing mechanisms, the holder is again turned up into a vertical position where it may be engaged by one of the abutments 84 of the longitudinally arranged endless carrier 69 and fed continuously along the track in a right line through the said second set of hackling and finishing mechanisms. As the holder with its completely hackled and finished fiber leaves the finishing mechanism it is again knocked down into a horizontal position on to one of the longitudinal extensions of the transverse sections of the track at the feed end of the machine where the holder may be engaged by one of the abutments 83 on the transversely arranged endless carrier 76. The holder is again guided in its movement around the corner from the extension 68 by the curved outer wall 67 of the track. As the holder reaches a certain position on the transverse section of the track, it will be released from its clamping engagement with the hackled and finished fiber. The next step in the movement of the holder will bring it into position to have its cover engaged by the lifting device, which device will lift the cover entirely away from the balance of the holder, thus permitting the operator to remove the bunch of hackled and finished fiber and substitute therefor a bunch of unhackled fiber. The cover is then brought down into its position and the next step in the movement of the holder brings it into position to be brought into clamping engagement with the fiber. From this point the successive steps in the operation are repeated as hereinbefore set forth.

It will thus be seen that the unhackled fiber may be completely hackled and finished during one continuous operation in a very simple and effective manner.

It will also be seen that the finishing mechanisms may be raised and lowered to permit them to properly act upon the ends of longer or shorter fiber. It will also be seen that means are provided for adjusting the co-acting sets of hackling pins toward and away from each other to permit them to perform their hackling operation with the utmost accuracy.

In the machine as herein set forth, the fiber is fed in a right line continuously through the hackling and finishing mechanisms and an intermittent movement is given to the fiber between the sets of mechanisms so as to permit the ready insertion, shifting and removal of the fiber. All swivel corner pieces for shifting the fiber holders from one section to another section is obviated and all up and down movement of the holders is done away with.

It has generally been supposed that hackling teeth or pins passing contiuously through the bunches of flax at an angle to the line of travel of the continuously moving bunch, would injure the flax and prove impractical. I have found, however, by careful experiment, that the flax may be expeditiously and advantageously hackled by such supposedly impractical means if the proper relative speeds of the flax and the hackles be maintained and the teeth or pins be properly arranged.

While I do not wish to limit myself to the particular relative speeds and arrangement of pins herein set forth, I have found that teeth or pins arranged in parallel rows both longitudinally and transversely of the continuously moving belts which carry them and driven in a right line at an angle to the travel of the flax at a speed about five times faster than the speed of the continuously traveling flax, will follow one another smoothly and effectively through the bunch with minimum harm to the flax.

It is evident that various changes may be made in the construction, form and arrangement and operation of the various parts of this machine without departing from the spirit and scope of the invention; hence I do not wish to limit myself strictly to the construction herein set forth, but

What I claim is:

1. In a machine of the character described, two hackling mechanisms arranged side by side, a continuous stationary track passing through both hackling mechanisms, fiber holders, means for imparting a continuous movement to the fiber holders through the hackling mechanisms and means for imparting an intermittent movement to the fiber holders between the hackling mechanisms along said continuous stationary track.

2. In a machine of the character described, two sets of hackling and finishing mechanisms arranged side by side, a continuous stationary track passing through both sets of hackling and finishing mechanisms, fiber holders and means for imparting a continuous movement to the fiber holders through the sets of hackling and finishing mechanisms and means for imparting an intermittent movement to the fiber holders between the said sets of mechanisms along the said continuous stationary track.

3. In a machine of the character described, two hackling mechanisms arranged side by side, a continuous stationary track passing through both hackling mechanisms, fiber holders, means for imparting a continuous movement to the fiber holders through the hackling mechanisms, means for imparting an intermittent movement to the fiber holders between the hackling mechanisms along said continuous stationary track, and means for releasing and clamping the fiber holders at points between the hackling mechanisms to permit the insertion, shifting and removal of the fiber.

4. In a machine of the character described, two sets of hackling and finishing mechanisms arranged side by side, a continuous stationary track, passing through both sets of hackling and finishing mechanisms, fiber holders, means for imparting a continuous movement to the fiber holders through the sets of hackling and finishing mechanisms, means for imparting an intermittent movement to the fiber holders between the said sets of mechanisms along the said continuous stationary track, and means for releasing and clamping the fiber holders at points between the sets of hackling and finishing mechanisms to permit the insertion, shifting and removal of the fiber.

5. In a machine of the character described, two hackling mechanisms arranged side by side, a continuous stationary track passing through both of the hackling mechanisms, fiber holders arranged to travel along said track, means for imparting a continuous movement in a right line to the holders through the hackling mechanisms and means for imparting an intermittent movement to the holders between the hackling mechanisms along said continuous stationary track, means for turning the holders up into a vertical position when entering each hackling mechanism and means for knocking the holders down into a horizontal position when leaving each hackling mechanism.

6. In a machine of the character described, two sets of hackling and finishing mechanisms arranged side by side, a continuous stationary track passing through both sets of hackling and finishing mechanisms, fiber holders arranged to travel along said track, means for imparting a continuous movement to the holders through the sets of hackling and finishing mechanisms and means for imparting an intermittent movement to the holders between the sets of hackling and finishing mechanisms along said continuous stationary track, means for turning the holders up into a vertical position when entering each set of mechanisms and means for knocking the holders down into a horizontal position when leaving each set of mechanisms.

7. In a machine of the character described, two hackling mechanisms arranged side by side, a continuous stationary track passing through both hackling mechanisms, fiber holders arranged to travel along said track, means for imparting a continuous movement in a right line to the holders through the hackling mechanisms and means for imparting an intermittent movement to the holders between the hackling mechanisms along said continuous stationary track, means for turning the holders up into a vertical position when entering each hackling mechanism, means for knocking the holders down into a horizontal position when leaving each hackling mechanism and means for releasing and clamping the holders at predetermined points to permit the insertion, shifting and removal of the fiber.

8. In a machine of the character described, two sets of hackling and finishing mechanisms arranged side by side, a continuous stationary track passing through both sets of hackling and finishing mechanisms, fiber holders arranged to travel along said track, means for imparting a continuous movement to the holders through the sets of hackling and finishing mechanisms and means for imparting an intermittent movement to the holders between the sets of hackling and finishing mechanisms along said continuous stationary track, means for turning the holders up into a vertical position when entering each set of mechanisms, means for knocking the holders down into a horizontal position when leaving each set of mechanisms and means for releasing and clamping the holders at predetermined points to permit the insertion, shifting and removal of the fiber.

9. In a machine of the character described, a hackling mechanism, a stationary track passing therethrough, fiber holders arranged to travel along said track through the hackling mechanism in a vertical position and means operated by the holders for successively knocking the preceding holders down into a horizontal position as they leave the hackling mechanism.

10. In a machine of the character described, a hackling mechanism, a finishing mechanism, a continuous stationary track passing therethrough, fiber holders arranged to travel along said track through the hackling and finishing mechanisms in a vertical position and means operated by the holders for successively knocking preceding holders down into a horizontal position as they leave the finishing mechanism.

11. In a machine of the character described, two hackling mechanisms arranged side by side, a continuous stationary track passing through both hackling mechanisms, fiber holders arranged to travel along said track, means for successively turning the holders up into a vertical position as they enter each hackling mechanism and means operated by the holders for successively knocking preceding holders down into a horizontal position as they leave each hackling mechanism.

12. In a machine of the character described, hackling mechanisms, fiber holders, endless carriers for feeding the holders continuously through the hackling mechanisms and endless carriers for feeding the holders intermittently between the hackling mechanisms.

13. In a machine of the character described, hackling mechanisms, a stationary track passing therethrough, fiber holders, endless carriers for feeding the holders continuously along the track through the hackling mechanisms and endless carriers for feeding the holders intermittently along the track between the hackling mechanisms.

14. In a machine of the character described, sets of hackling and finishing mechanisms, a stationary track passing therethrough, fiber holders, endless carriers for feeding the holders continuously along the track through the sets of hackling and finishing mechanisms and endless carriers for feeding the holders intermittently along the track between the sets of mechanisms.

15. In a machine of the character described, hackling mechanisms, fiber holders, longitudinally arranged endless carriers for feeding the holders through the hackling mechanisms, transversely arranged endless carriers for feeding the holders between the hackling mechanisms and a common driving means for imparting a continuous movement to the longitudinally arranged endless carriers and an intermittent movement to the transversely arranged endless carriers.

16. In a machine of the character described, hackling mechanisms, a continuous stationary track passing therethrough, fiber holders, longitudinally arranged endless carriers for feeding the holders along the track through the hackling mechanisms, transversely arranged endless carriers for feeding the holders along the track between the hackling mechanisms and a common driving means for imparting a continuous movement to the longitudinally arranged endless carriers and an intermittent movement to the transversely arranged endless carriers.

17. In a machine of the character described, sets of hackling and finishing mechanisms, a continuous stationary track passing therethrough, fiber holders, longitudinally arranged endless carriers for feeding the holders along the track through the hackling and finishing mechanisms, transversely arranged endless carriers for feeding the holders along the track between the sets of mechanisms and a common driving means for imparting a continuous movement to the longitudinally arranged endless carriers and an intermittent movement to the transversely arranged endless carriers.

18. In a machine of the character described, a track, fiber holders, an endless carrier for feeding them along the track in a horizontal position and a device for successively turning the holders up into a vertical position, comprising a rocking arm arranged in position to be engaged by said endless carrier at predetermined times and a holder engaging arm controlled by the movement of the first named arm.

19. In a machine of the character described, a track, fiber holders, an endless carrier for feeding them along the track in a horizontal position and a device for successively turning the holders up into a vertical position comprising a vertical rock shaft having an arm arranged in position to be engaged by said endless carrier at predetermined times and a horizontal shaft geared to the vertical shaft and having a holder engaging arm.

20. In a machine of the character described, a track having a slot therein, fiber holders arranged to travel along said track in a horizontal position and having lugs projecting downwardly through said slot, an endless carrier having abutments arranged to engage said lugs for feeding the fiber holders along the track and a device for successively turning the holders up into a vertical position comprising a rocking arm arranged to be engaged by said abutments on the endless carrier and a holder engaging arm geared to said rocking arm.

21. In a machine of the character described, a track, fiber holders, an endless carrier for feeding them along the track in a vertical position and a device for successively knocking the holders down into a horizontal position comprising a rocking lever having one arm arranged to be successively engaged by the vertical holders and another arm arranged to engage preceding holders.

In testimony, that I claim the foregoing as my invention, I have signed my name in presence of two witnesses, this seventeenth day of June 1908.

JOHN E. BARBOUR.

Witnesses:
F. GEORGE BARRY,
C. S. SUNDGREN.

---

Copies of this patent may be obtained for five cents each, by addressing the "Commissioner of Patents, Washington, D. C."